United States Patent
Miller

(12) 
(10) Patent No.: US 6,633,608 B1
(45) Date of Patent: Oct. 14, 2003

(54) METHOD AND APPARATUS FOR ADAPTING MEMORY RESOURCE UTILIZATION IN AN INFORMATION STREAM DECODER

(75) Inventor: Henry S. Miller, Yardley, PA (US)

(73) Assignee: Sarnoff Corporation, Princeton, NJ (US)

( * ) Notice: Subject to any disclaimer, the term of this patent is extended or adjusted under 35 U.S.C. 154(b) by 0 days.

(21) Appl. No.: 09/320,914

(22) Filed: May 27, 1999

(51) Int. Cl.7 .................................................. H04B 1/66
(52) U.S. Cl. .................................................. 375/240.02
(58) Field of Search .................................. 348/233, 299, 348/402, 441, 440; 375/240.16, 240.02, 240.17, 240.15; 382/298, 248, 250, 253; 725/86, 52, 93

(56) References Cited

U.S. PATENT DOCUMENTS 5,210,534 A * 5/1993 Janex .......................... 340/984
6,075,906 A * 6/2000 Fenwick et al. ............. 382/298
6,310,919 B1 * 10/2001 Florencio ................ 375/240.16
6,367,079 B1 * 4/2002 De Vos et al. ................. 725/86
2001/0019336 A1 * 9/2001 Gordon et al. .............. 345/719

* cited by examiner

*Primary Examiner*—C. Kelley
*Assistant Examiner*—Behrooz Senfi
(74) *Attorney, Agent, or Firm*—William J. Burke

(57) ABSTRACT

A method and apparatus for reducing memory and memory bandwidth requirements in an MPEG-like decoder by preferentially allocating, in a first mode of operation, memory to an anchor frame storage functions and re-allocating, in a second mode of operation, some of the allocated memory to another function. The reduction image quality cause by the reduction in anchor frame memory is somewhat offset by a frequency domain CODE used in conjunction with the anchor frame memory in the second mode of operation.

23 Claims, 5 Drawing Sheets

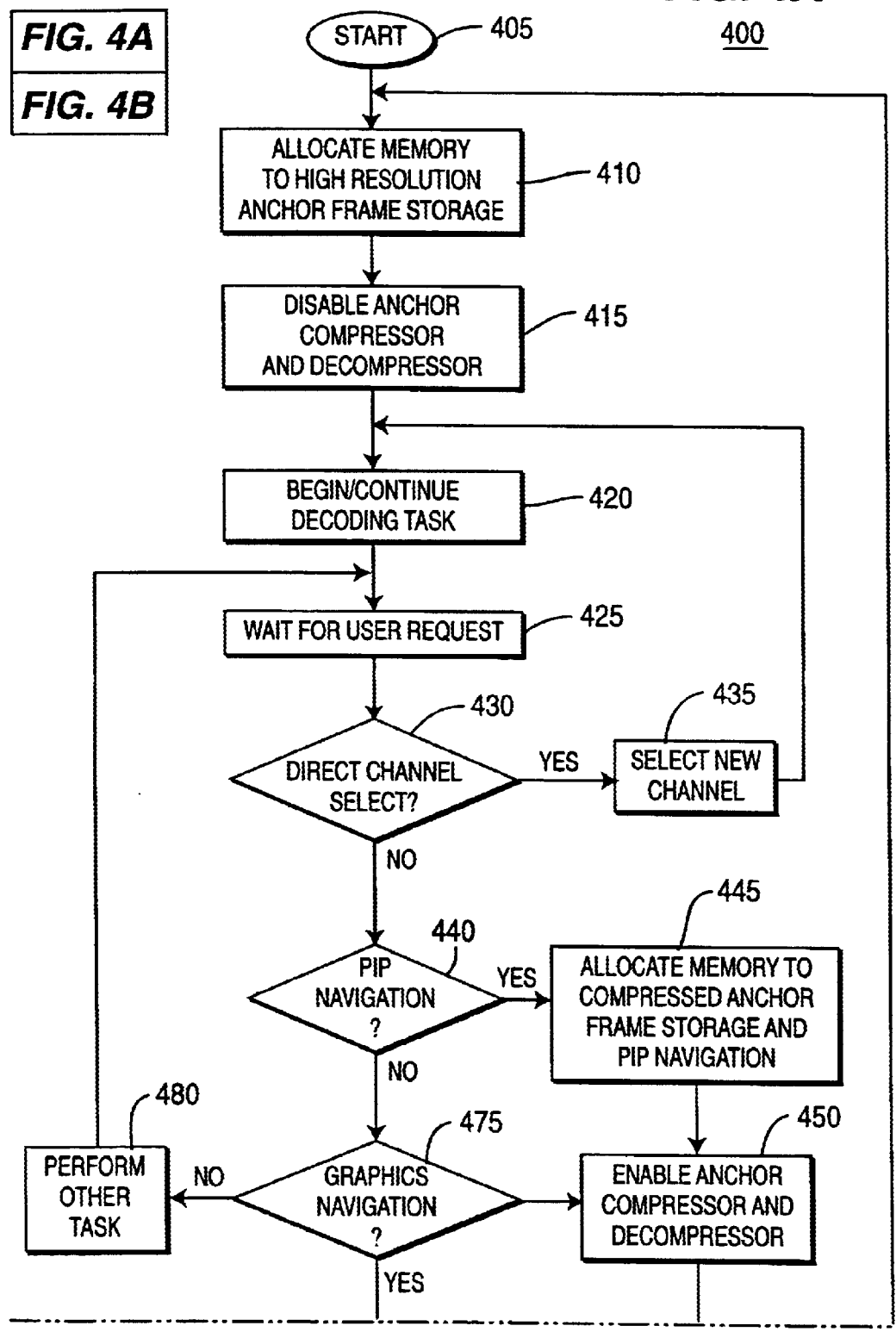

METHOD AND APPARATUS FOR ADAPTING MEMORY RESOURCE UTILIZATION IN AN INFORMATION STREAM DECODER

The invention relates to communications systems generally and, more particularly, the invention relates to a method and apparatus for increasing memory utilization in an information stream decoder, such as an MPEG-like video decoder.

BACKGROUND OF THE DISCLOSURE

In several communications systems the data to be transmitted is compressed so that the available bandwidth is used more efficiently. For example, the Moving Pictures Experts Group (MPEG) has promulgated several standards relating to digital data delivery systems. The first, known as MPEG-1 refers to ISO/ICE standards 11172 and is incorporated herein by reference. The second, known as MPEG-2, refers to ISO/ICE standards 13818 and is incorporated herein by reference. A compressed digital video system is described in the Advanced Television Systems Committee (ACTS) digital television standard document A/53, and is incorporated herein by reference.

The above-referenced standards describe data processing and manipulation techniques that are well suited to the compression and delivery of video, audio and other information using fixed or variable length digital communications systems. In particular, the above-referenced standards, and other "MPEG-like" standards and techniques, compress, illustratively, video information using intra-frame coding techniques (such as run-length coding, Hoffman coding and the like) and inter-frame coding techniques (such as forward and backward predictive coding, motion compensation and the like). Specifically, in the case of video processing systems, MPEG and MPEG-like video processing systems are characterized by prediction-based compression encoding of video frames with or without intra- and/or inter-frame motion compensation encoding.

In a typical MPEG decoder, predictive coded pixel blocks (i.e., blocks that comprise one or more motion vectors and a residual error component) are decoded with respect to a reference frame (i.e., an anchor frame). The anchor frame is stored in an anchor frame memory within the decoder, typically a dual frame memory. As each block of an anchor frame is decoded, the decoded block is coupled to a first portion of the dual frame memory. When an entire anchor frame has been decoded, the decoded blocks stored in the first portion of the dual frame memory are coupled to a second portion of the dual frame memory. Thus, the second portion of the dual frame memory is used to store the most recent full anchor frame, which is in turn used by a motion compensation portion of the decoder as the reference frame for decoding predictive coded blocks.

Unfortunately, the cost of the memory necessary to implement an anchor frame memory may be quite high, in terms of money and in terms of integrated circuit die size (which impacts circuit complexity, reliability, power usage and heat dissipation). Moreover, as the resolution of a decoded image increases, the size of the required memory increases accordingly.

To reduce memory requirements in applications where image resolution is not critical (e.g., a small or relatively low resolution display device), it is known to compress image information prior to anchor frame storage, and decompress image information retrieved from anchor frame storage. However, since high quality systems demand high quality image information, such image degradation is not acceptable. Additionally, such high quality systems also tend to include other memory-consuming functions, such as picture in picture (PIP) or graphics-based channel navigation functions, thereby exacerbating the memory cost and bandwidth problem.

Therefore, it is seen to be desirable to provide a method and apparatus that significantly reduces the memory and memory bandwidth required to decode a video image while substantially retaining the quality of a resulting full-resolution or down sized video image and accommodating navigation and other memory-consuming functions.

SUMMARY OF THE INVENTION

The invention comprises a method and apparatus for reducing memory and memory bandwidth requirements in an MPEG-like decoder. Memory and memory bandwidth requirements are reduced by compressing image information prior to storage, and decompressing the stored (compressed) image information prior to utilizing the image information in, e.g., a motion compensation module of the decoder. Additionally, memory requirements are reduced by allocating, according to a mode of operation, available memory between a plurality of functions. In this manner, the amount of memory required to implement the decoder functions and other functions may be kept to a minimum.

In a first mode of operation, memory is preferentially allocated to an anchor frame storage function. In a second mode of operation, some of the anchor frame memory is re-allocated to another function. The reduction image quality cause by the reduction in anchor frame memory is somewhat offset by a frequency domain CODE used in conjunction with the anchor frame memory in the second mode of operation.

Specifically, in a system for decoding an MPEG-like information stream including compressed image information, a method according to the invention for adapting memory usage comprising the steps of: allocating, in a first mode of operation, a first level of available memory resources for storing relatively high resolution anchor frame information; allocating, in a second mode of operation, a second level of available memory resources for storing relatively low resolution anchor frame information, the first level of available memory resources being larger than the second level of available memory resources; and allocating, in the second mode of operation, a third level of available memory resources to a processing task, the third level of available memory resources comprising a resource level allocation difference between the first and second level of available memory resources.

BRIEF DESCRIPTION OF THE DRAWINGS

The teachings of the present invention can be readily understood by considering the following detailed description in conjunction with the accompanying drawings, in which.

To facilitate understanding, identical reference numerals have been used, where possible, to designate identical elements that are common to the figures.

DETAILED DESCRIPTION

The invention will be described within the context of a video decoder, illustratively an MPEG-2 video decoder. However, it will be apparent to those skilled in the art that the invention is applicable to any video processing system, including those systems adapted to DAB, MPEG-1 and other information streams.

Specifically, the invention will be primarily described within the context of an MPEG-like decoding system that receives and decodes a compressed video information stream IN to produce a video output stream OUT. The invention operates to reduce total memory and memory bandwidth requirements in the MPEG-like decoder. In a first mode of operation, illustratively a "high resolution" mode of operation, the invention preferentially allocates available memory resources to an anchor frame storage function. In a second mode of operation, illustratively a "low resolution" mode of operation, the invention reallocates some memory resources from the anchor frame storage function to another function. For example, the other function may comprise a picture in picture (PIP) navigation function, a graphical navigation function or other processing function not normally invoked during the first mode of operation. In this manner, memory resource utilization is reduced in a global manner within the context of, e.g., an MPEG-like decoder.

Figure 1:
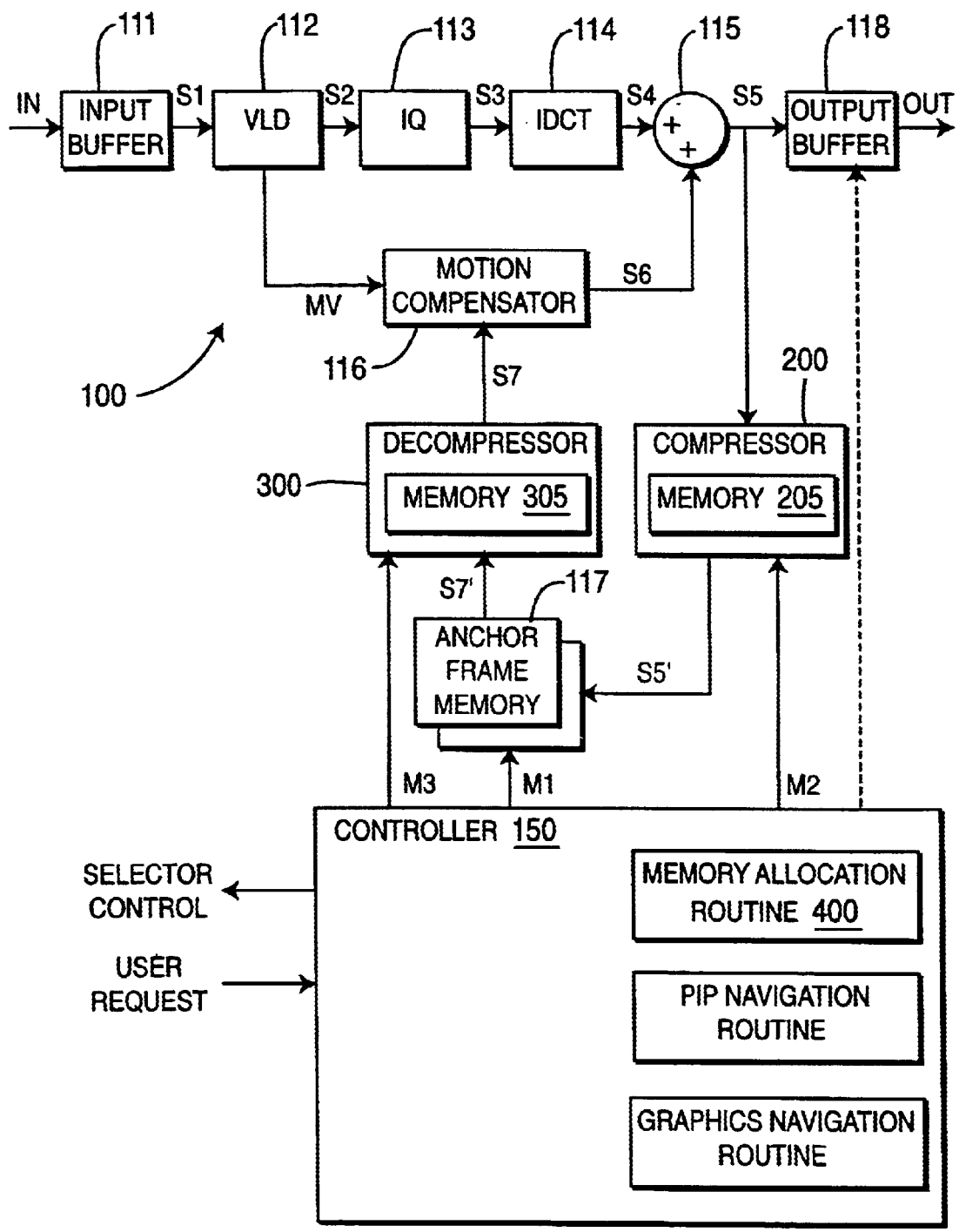
FIG. 1 depicts an embodiment of an MPEG-like decoder according to the invention.

FIG. 1 depicts an embodiment of an MPEG-like decoder 100 according to the invention. Specifically, the decoder 100 of FIG. 1 receives and decodes a compressed video information stream IN to produce a video output stream OUT. The video output stream OUT is suitable for coupling to, e.g., a display driver circuit within a presentation device (not shown).

The MPEG-like decoder 100 comprises an input buffer memory module 111, a variable length decoder (VELD) module 112, an inverse quantizes (IQ) module 113, an inverse discrete cosine transform (ID CT) module 114, a summer 115, a motion compensation module 116, an output buffer module 118, an anchor frame memory module 117, a controller 150, a compression module 200 and a decompression module 300.

The input buffer memory module 111 receives the compressed video stream IN, illustratively a variable length encoded bit stream representing, e.g., a high definition television signal (HDTV) or standard definition television signal (SDTV) output from a transport demultiplexer/decoder circuit (not shown). The input buffer memory module 111 is used to temporarily store the received compressed video stream IN until the variable length decoder module 112 is ready to accept the video data for processing. The VELD 112 has an input coupled to a data output of the input buffer memory module 111 to retrieve, e.g., the stored variable length encoded video data as data stream S1.

The VLD 112 decodes the retrieved data to produce a constant length bit stream S2 comprising quantized prediction error DCT coefficients, and a motion vector stream MV.

The IQ module 113 performs an inverse quantization operation upon constant length bit stream S2 to produce a bit stream S3 comprising quantized prediction error coefficients in standard form. The IDCT module 114 performs an inverse discrete cosine transform operation upon bit stream S3 to produce a bit stream S4 comprising pixel-by-pixel prediction errors.

The summer 115 adds the pixel-by-pixel prediction error stream S4 to a motion compensated predicted pixel value stream S6 produced by the motion compensation module 116. Thus, the output of summer 115 is, in the exemplary embodiment, a video stream S5 comprising reconstructed pixel values. The video stream S5 produced by summer 115 is coupled to the compression module 200 and the output buffer module 118.

The compression module 200 compresses the video stream S5 on a block by block basis to produce a compressed video stream S5'. The operation of the compression module 200 will be described in more detail below with respect to FIGS. 2, 4 and 5. Briefly, the compression module 200 operates on a pixel block by pixel block basis (e.g., a 4×4, 4×8 or 8×8 pixel block) to compress each pixel block within an anchor frame by processing the block according to a Haar wavelet transform, preferentially quantizing the resulting Haar coefficient block, scaling the resulting quantized coefficients and packing the scaled coefficients and associated scaling factors to form a scaled, quantized, Haar domain representation of the pixel block that is coupled to the compression module output as part of compressed video stream S5'. It is noted by the inventor that such a scaled, quantized, Haar domain representation of the anchor frame requires approximately half the memory required for the pixel domain anchor frame representation. Thus, the memory requirements of anchor frame memory module 117 are reduced by a factor of two.

Prior to performing a Haar wavelet transform on a pixel block, the pixel block is optionally processed using a one- or two-dimensional DCT function, and, optionally, a DCT coefficient truncation function. The resulting DCT coefficients (truncated or not) are then processed according to the Haar wavelet transform.

In one embodiment of the invention, 4×4 pixel blocks are subjected to a 2D Haar wavelet transform, the results of which are adaptively quantized and scaled prior to being packed into data words for subsequent storage in, e.g., anchor frame memory module 117. Each of the resulting scaled, Haar domain representations of the 4×4 pixel blocks occupies approximately 64 or fewer bits. This embodiment of the invention effects a 2:1 compression of pixel information, and will be discussed in more detail below with respect to FIGS. 4 and 5.

In another embodiment of the invention, 4×8 pixel blocks (i.e., 4 pixel rows by 8 columns) are processed using a 1D or 2D DCT to produce respective 4×8 blocks of DCT coefficients. After truncating the high order DCT coefficients, the resulting 4×4 blocks of DCT coefficients are subjected to 2D Haar wavelet transform, the results of which are adaptively quantized and scaled prior to being packed into data words. Each of the resulting scaled, Haar domain representations of the pixel blocks occupies approximately 64 or fewer bits. This embodiment of the invention effects a 4:1 compression of pixel information.

The anchor frame memory module 117 receives and stores the compressed video stream S5'. Advantageously, the size of the anchor frame memory module 117 may be reduced to half the normal size, since a 2:1 compressed representation of the pixel block is stored, rather than the pixel block itself. The compressed pixel blocks stored in the anchor frame memory module 117 must be provided to the motion compensation module 116 for further processing. However, since the motion compensation module processes uncompressed pixel data, the compressed pixel blocks are first provided to decompression module 300 via signal path S7' for decompression.

Decompression module 300 essentially mirrors the operation of the compression module 200 described above (or alternate embodiments described below). That is, decompression module 300 receives each Haar domain block and unpacks the received Haar domain block to retrieve the Haar coefficients and the previously used scaling factors. The unpacked Haar coefficients are then scaled using the unpacked scaling factors and subjected to an inverse Haar wavelet transform to substantially reproduce the original pixel block. Optionally, the inverse Haar wavelet transform produces a block of DCT coefficients, which are then subjected to an inverse DCT transform to substantially reproduce the original pixel block. The decompression module 300 will be discussed in more detail below with respect to FIG. 3.

The decompression module 300 is accessed by the motion compensation module 116 via signal path S7. That is, the motion compensation module 116. utilizes one or more stored anchor frames (e.g., the substantially reproduced pixel blocks forming the most recent I-frame or P-frame of the video signal produced at the output of the summer 115), and the motion vector signal MV received from the VLD 112, to calculate the values for the motion compensated predicted pixel value stream S6.

In one embodiment of the invention, compression module 200 operates to sub-sample, or decimate, the pixel information within video stream S5 to produce effect a resizing (i.e., downsizing) of the video image represented by the pixel data. For example, a 1920 pixel by 1080 line high definition image may be resized to a smaller image, such as a standard 720 pixel by 480 line image, or some other non-standard format selected to generally reduce memory requirements or reduce memory requirement to a specific level determined by, e.g., available semiconductor area or other factors.

In the case of compression module 200 operating in a sub-sample, or decimate, mode, decompression module 300 operates to calculate (i.e., approximate) image information previously removed by the decimation operation of the compressor module, such that the motion compensation module 116 receives pixel information representative of an appropriate image size. It must be noted that the sub-sampling operation of compressor module 200 and the interpolation operation of decompression module 300 will inherently cause a loss in image resolution and image quality. However, within the context of, e.g., a presentation system incapable of providing such resolution (i.e., a small display tube television system) the loss of image resolution will not be noticed, and the cost savings from memory reduction may be critical to the market success of the presentation system.

It must be noted that the compression module 200 and decompression module 300 may utilize compression/decompression (CODEC) algorithms and techniques other than those described in this disclosure.

The controller 150 operates to adapt a memory resource allocation between the anchor frame memory 117, compression module memory 205, decompression module memory 305 and, optionally, output buffer memory 118 via respective control signals M1, M2, M3 and M4. The operation of the controller 150 will be described in more detail below with respect to FIGS. 4–7. Briefly, the controller 150 operates to allocate memory resources between the various system elements utilizing such resources in a manner tending to effect a conservation of memory resources and memory bandwidth requirements.

The memory resource allocation decision is made within the context of appropriate display quality of a system utilizing the MPEG-like decoder 100 of FIG. 1. For example, in the case of the decoder 100 operating to decode, for subsequent display, high quality video information (i.e., no compression/decompression used), the anchor frame memory 117 will be fully allocated, while the compression module memory 205 and decompression module memory 305 will receive little or no allocation. Alternatively, in the case of picture in picture (PIP) navigation window being displayed over video information (i.e., where the quality of the video information is less important), the anchor frame memory 177 will receive a less than full allocation. Specifically, since the compression module 200 and decompression module 300 will operate to compress and decompress the information stored and retrieved form the anchor frame memory by a defined scaling factor, the amount of memory allocated to the anchor frame memory 117 is reduced according to that scaling factor.

Figure 2:
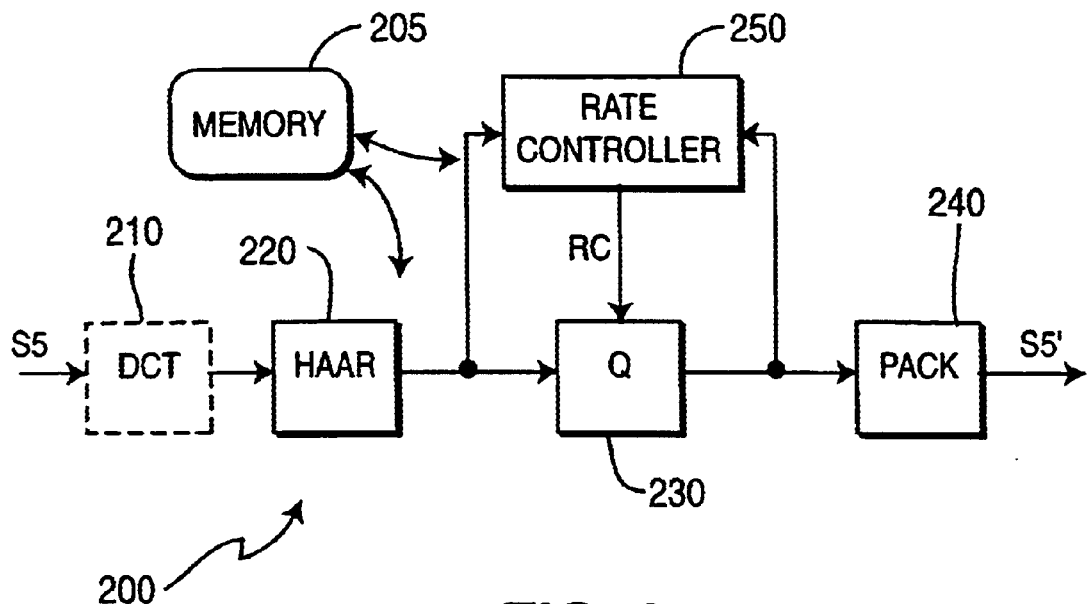
FIG. 2 depicts a compression module suitable for use in the MPEG-like decoder of FIG. 1.

FIG. 2 depicts a compression module 200 suitable for use in the MPEG-like decoder of FIG. 1. The compression module 200 comprises a memory module 205, an optional discrete cosine transform module (DCT) 210, a wavelet transform module 220, illustratively a Haar wavelet transform module (HAAR), a quantization module (Q) 230, a packing module (PACK) 240 and a rate control module 250. The functionality of the compression module may be implemented as an application specific integrated circuit (ASIC) or as a general purpose computer that is programmed to perform specific control functions in accordance with the present invention.

The memory module 205 depicted in FIG. 2, which is shown as being generally associated with the other functional components of the compression module 200, is representative of an allocation of memory resources sufficient to enable the compression module 200 to function. This memory allocation comprises a portion of memory that, in one embodiment of the invention, is normally allocated to the anchor frame storage module 117 during a high resolution mode of operation.

The compression module 200 operates in one of a discrete cosine transform (DCT) compression mode and a non-DCT compression mode to effect a compression of the pixel information included within the video stream S5.

In the non-DCT compression mode, the compression unit 200 effects a 2:1 compression of pixel information. For example, in the case of a 4×4 pixel block having 8 bit dynamic range (comprising approximately 128 bits of information), the compression module operating in the non-DCT mode produces a 64 bit representation of each 4×4 pixel without substantial loss in image quality. Similarly, in the case of an 8×8 pixel block (approximately 512 bits) or an 8×4 pixel block (approximately 256 bits), the compression module operating in the non-DCT mode produces, respectively, a 256 bit or a 128 bit representation without substantial loss in image quality.

In the DCT compression mode (i.e., where high order DCT coefficients are truncated prior to Haar transformation), the compression unit 200 effects a 4:1 compression of pixel information. Thus, in the case of an 8×8 pixel block (approximately 512 bits) or an 8×4 pixel block (approximately 256 bits), the compression module operating in the DCT mode produces, respectively, a 128 bit or a 64 bit representation of the pixel information, albeit with a slight reduction in high frequency image information (e.g., "edge" information).

The output of the DCT module 210 is coupled to the Haar transform module 220, where the input pixel block or DCT coefficient block is subjected to a Haar transform process. The resulting Haar coefficient block is coupled to the quantizes 230. Quantizer 230, in response to a control signal RC produced by rate controller 250, preferentially quantizes and scales the Haar wavelet coefficient block to produce a data word, which is coupled to the packing module 240 as information stream S5'. Rate controller 250 monitors the input to the quantizes 230 and the output from the quantizer 230 to determine the type and size of the coefficient blocks being quantized.

In the non-DCT compression mode, each, illustratively, 4×4 pixel block (i.e., pixels $x_0$ through $x_{15}$) is subjected to a two dimensional Haar wavelet transformation to produce a corresponding 4×4 Haar coefficient block (i.e., coefficients $X_0$ through $X_{15}$). Each of the Haar coefficients represents the spectral energy associated with a portion of the horizontal spatial frequency components and vertical frequency components of the video information contained within the 4×4 pixel block. The Haar coefficients are then quantized in a preferential manner such that "important" coefficients (i.e., those coefficients representing spatial frequency components providing image information more readily discernable to the human eye) are allocated more bits than less important coefficients. The quantized coefficients are then scaled by a factor of $\frac{1}{2}^n$, where n is selected as the minimum n that satisfies the following relationship: $2^{(n+m)}$ is less than the maximum value of the absolute value of wavelet coefficients in a set, where a set refers those coefficients that share the same scaling factor and m is the number of bits allocated to each coefficient in the set. Finally, the scaled coefficients and the associated scaling factors are packed into an (approximately) 64 bit word. The 64 bit word is then coupled to the anchor frame memory module 117 as part of compressed video stream S5'.

In the DCT compression mode, each, illustratively, 4×8 pixel block (i.e., pixels $x_0$ through $x_{31}$) is subjected to a 1D or 2D DCT function to produce a corresponding 4×8 DCT coefficient block (i.e., coefficients $X_{0'}$ through $X_{31'}$). The high order DCT coefficients are the truncated (i.e., coefficients $X_{16'}$ through $X_{31'}$), resulting in a 4×4 DCT coefficient block (i.e., coefficients $X_{0'}$ through $X_{15'}$). The resulting DCT coefficient block is then subjected to a two dimensional Haar wavelet transformation to produce a corresponding 4×4 Haar wavelet coefficient block (i.e., coefficients $X_0$ through $X_{15}$). The Haar wavelet coefficients are then preferentially quantized, scaled and packed in substantially the same manner as provided in the non-DCT mode of operation to produce, in the case of a 4×8 pixel block, a corresponding 64 bit word. The 64 bit word is then coupled to the anchor frame memory module 117 as part of compressed video stream S5'.

The selection of DCT mode or non-DCT mode may be made according to the needs of a particular application. For example, in a low resolution or standard definition (i.e., not high definition) television application, it may be acceptable to "drop" some of the high frequency detail information in the image, whereas such information may be crucial to a high definition application. Additionally, the memory constraints within which a decoder is designed may dictate the use of an enhanced level of compression, such as provided by the DCT mode of operation.

Figure 3:
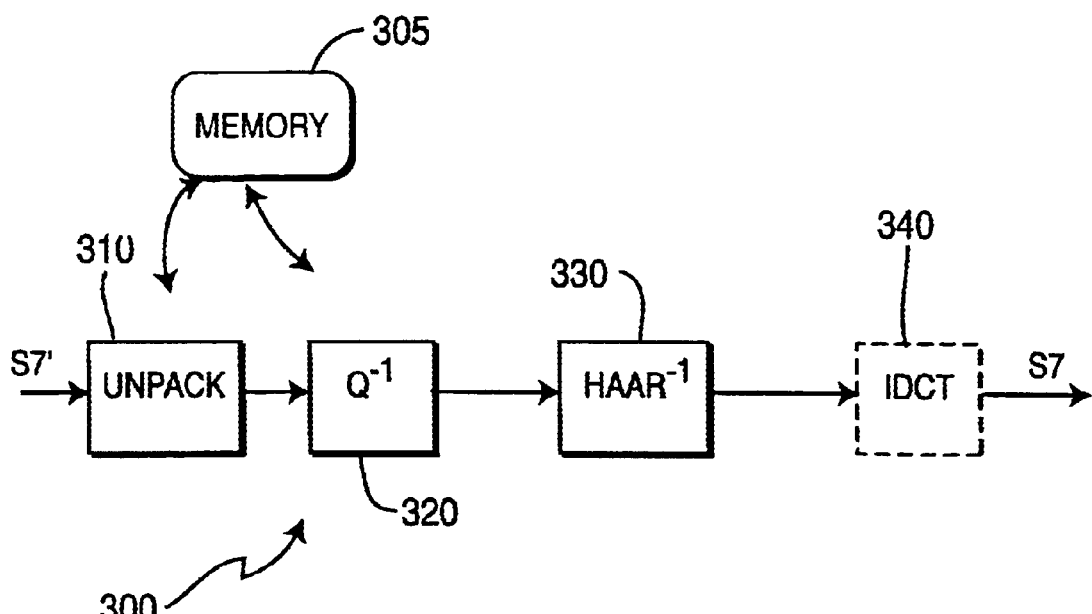
FIG. 3 depicts a decompression module suitable for use in the MPEG-like decoder of FIG. 1.

FIG. 3 depicts a decompression module 300 suitable for use in the MPEG-like decoder of FIG. 1. The decompression module 300 of FIG. 3 comprises a memory module 305 and a series coupling in the order named of an unpacking module 310, an inverse quantization (Q-1) module 320, an inverse Haar transform (HAAR-1) module 330 and an optional inverse discrete cosine transform module (IDCT) 340.

The memory module 305 depicted in FIG. 3, which is shown as being generally associated with the other functional components of the decompression module 300, is representative of an allocation of memory resources sufficient to enable the decompression module 300 to function. This memory allocation comprises a portion of memory that, in one embodiment of the invention, is normally allocated to the anchor frame storage module 117 during a high resolution mode of operation.

The decompression module 300 operates in the reverse order, and with the inverse functionality of, the corresponding modules described above with respect to the compression module 200. Therefore, the operation of the decompression module will not be discussed in great detail. Briefly, the decompression module 300 receives a packed data word, unpacks the data word to retrieve a Haar wavelet coefficient block and performs an inverse Haar wavelet transformation on the unpacked coefficient block to produce a DCT coefficient block or a pixel block. In the case of a DCT coefficient block that was not truncated by the compression module 200, the DCT coefficient block is subjected to an inverse DCT operation to produce a pixel block. In the case of a DCT coefficient block that was truncated by the compression module 200, NULL coefficients are added to the DCT coefficient block to fill it out to the appropriate size, and the "filled out" DCT coefficient block is subjected to an inverse DCT operation to produce a pixel block.

Figure 4B:
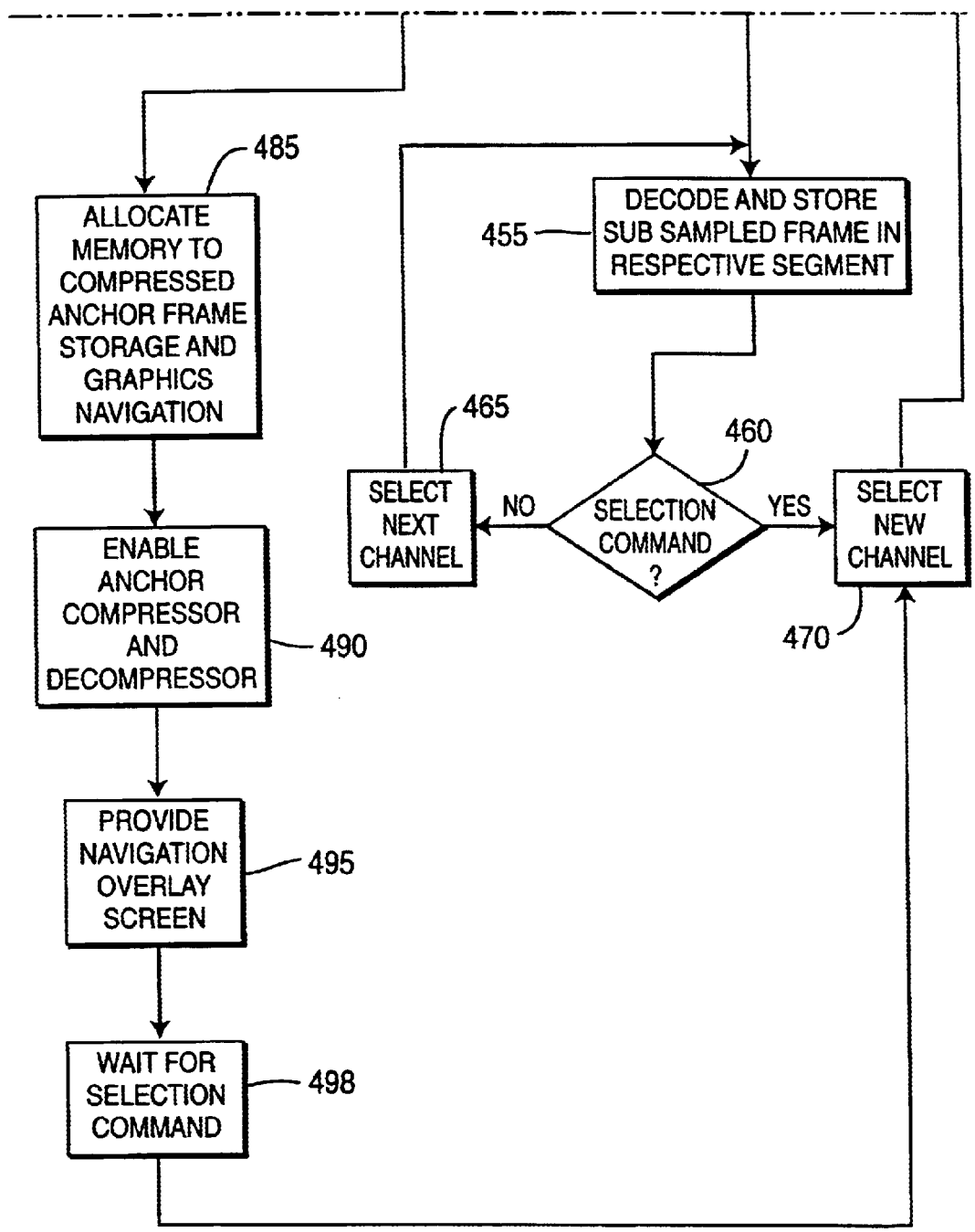
FIG. 4 depicts a flow diagram of a memory allocation method suitable for use in the MPEG-like decoder of FIG. 1.

FIG. 4 depicts a flow diagram of a method for allocating memory suitable for use in the MPEG-like decoder of FIG. 1. Specifically, FIG. 4 depicts a flow diagram of a method for allocating memory including anchor frame memory in response to, e.g., a user interaction. The method 400 of FIG. 4 is particularly well suited for use in an MPEG-like decoder where a single allocable memory is used to provide substantially all memory resources to a plurality of function modules. For example, in the case of the MPEG-like decoder 100 of FIG. 1, it is assumed that the anchor frame memory 117, output buffer 118, compression module memory 205, decompression module memory 305 and other memory requirements within the decoder are supplied using a single memory module.

The method 400 is entered at step 405 and proceeds to step 410, where a portion of available memory is allocated to high resolution anchor frame storage. That is, at step 410 a portion of, e.g., the single memory module within the decoder 100 of FIG. 1 is allocated to the anchor frame memory module 117 that is sufficient to enable the anchor frame memory module to store high resolution anchor frame image information. The method 400 then proceeds to step 415.

At step 415 the compression module 200 and decompression module 300 are disabled. That is, at step 415 the compression module 200 is disabled such that image information received by a signal path S5 is coupled, without compression processing, to anchor frame memory 117 as information stream S5'. Similarly, decompression module 300 is disabled such that stored image information retrieved from the anchor frame memory 117 is coupled, without decompression processing, to motion compensation module 116 as information stream S7. In this manner, the compression function and decompression function optionally utilized to effect a reduction in anchor frame memory storage requirements is not used, thereby providing the highest possible quality anchor frame image for subsequent decoding of predicted image frames. The method 400 then proceeds to step 420.

At step 420 the decoding task of the decoder 100 of FIG. 1 is begun or continued. That is, at step 420 the decoder 100 of FIG. 1 begins or continues operating to decode a previously selected compressed information stream IN to responsively produce a output image stream OUT. The method 400 then proceeds to step 425.

At step 425 the method 400 waits for a user request. A user request is received via, e.g., a remote control unit (not shown) or other input circuitry (not shown) through the controller 400 of FIG. 1. After receiving a user request, the method 400 proceeds to step 430.

At step 430 a query is made as to whether the received user request is a direct channel selection. That is, a query is made as to whether the user request comprises the selection of a particular or defined channel such that the selected or new channel may be immediately processed. If the query is answered affirmatively, then the method 400 proceeds to step 435. If the query at step 430 is answered negatively, then the method 400 proceeds to step 440.

At step 435 the new channel is selected by, e.g., utilizing the SELECTOR CONTROL to cause selector circuitry such as a transport demultiplexer (not shown) to select the new channel. The new channel is selected in a known manner by, e.g., tuning, demodulating and/or demultiplexing a physical or logical information stream, such as an MPEG-like transport stream including program information associated with the selected new channel. The method 400 then proceeds to step 420, where the decoding task for the new channel begins.

At step 440 a query is made as to whether the user request is for a picture in picture (PIP) navigation mode. If the query at step 440 is answered affirmatively, then the method 400 proceeds to step 445. If the query at step 440 is answered negatively, then the method 440 proceeds to step 475.

PIP navigation may comprise, e.g., the steps of displaying, on a display device available to a user, a mosaic image comprising several sub-images or sub-pictures. Each sub-image is associated with a particular channel. The user may select a new channel to be viewed by selecting, via a remote control device, one of the displayed sub-images. It is noted that the resolution necessary to adequately display each of the sub-images is much less than the resolution suitable for displaying a high definition or high resolution image. An exemplary display screen for implementing a PIP navigation function will be described below with respect to FIG. 7.

At step 445 a portion of the memory resources previously allocated to high resolution anchor frame storage are re-allocated to the PIP navigation function and to low resolution anchor frame storage. The memory resources allocated to the PIP navigation function comprise resources sufficient to store a plurality of sub-images for subsequent display on a display device. That is, the PIP navigation function memory resources are segmented into a plurality of memory segments, where each segment is associated with one of a corresponding plurality of sub-images which will be displayed as part of a PIP mosaic. The method 400 then proceeds to step 450.

At step 450 the compression module 200 and decompression module 300 are enabled. That is, at step 450 the compression module 200 is enabled such that image information received by a signal path S5 is compressed to produce compressed image information for storage in anchor frame Similarly, decompression module 300 is enabled such that stored compressed image information retrieved from the anchor frame memory 117 is decompressed and coupled to the motion compensation module 116 as information stream S7. The method 400 then proceeds to step 455.

The re-allocation of memory at step 445 and the enabling of the compression module 200 and decompression module 300 at step 450 allow for the continuation of the decode function of the MPEG-like decoder while enabling the PIP function. Specifically, for PIP function purposes, the re-allocated memory is divided into a plurality of sub-portions or segments, where each segment is associated with a sub-image. Each sub-image comprises a reduced size (i.e., reduced resolution) image that is intended to be displayed in a predefined portion of a display device screen. Thus, in the case of a PIP navigation structure comprising a 4×4 grid of sub-images, where each sub-image represents a recent image frame (e.g., an I-frame or a P-frame) from a respective channel, the re-allocated memory is divided into 16 segments for display purposes. Each information segment is then populated with image information from a respective channel (i.e., a logical channel from, e.g., a demodulated transport stream or a physical channel from, e.g., a tuned analog or other image information stream).

At step 455 a compressed image frame from the presently selected channel is decoded and stored in a respective memory segment. For example, an image frame such as an I-frame or a P-frame previously decoded is compressed by compression module 200 to produce a smaller image frame (e.g., a sub-image frame) which is then stored in a respective memory segment within the PIP mosaic display memory. The method 455 then proceeds to step 460.

At step 460 a query is made as to whether a selection command has been received. That is, at step 460 a query is made as to whether a user viewing a PIP mosaic has selected one of the sub-images displayed for subsequent viewing as a main image (i.e., a high resolution full screen image). If the query at step 460 is answered affirmatively, then the method 400 proceeds to step 470, where the new channel is selected, and to step 410, where memory is allocated to high resolution anchor frame storage. If the query at step 460 is answered negatively, then a next channel is selected, and the method 400 proceeds to step 455, where a image frame from the selected next channel is decoded and stored in a respective memory portion for subsequent display as part of the PIP mosaic or grid.

If the query at step 440 is answered negatively, indicating that PIP navigation has not been requested by a user, then the method 400 proceeds to step 475. At step 475 a query is made as to whether the user has requested a graphics navigation task. If the query is answered negatively, then the user has requested some other task be performed. In this case, the method 400 proceeds to step 480 where the other task is performed, and to step 425, where the method 400 waits for the next user request. If the query at step 475 is answered affirmatively, then the user has requested a graphics navigation task be performed and the method 400 proceeds to step 485.

Graphics navigation may comprise, e.g., the steps of displaying, on a display device available to a user, a graphical display of text, icon or other graphical information indicative of a one or more channels, programs or information streams that may be retrieved by selected for presentation by a user via, e.g., a remote control device. A common example of such a graphical navigation task is a graphical grid indicating channel number as a function of time (or time as a function of channel number) and program material available on each channel at a particular time. The user selects a channel by, e.g., manipulating an icon indicative of a highlight box until an appropriate channel/time grid coordinate is displayed. The user may then press an "enter" key on a remote control device (not shown) to indicate selection of the highlighted channel.

At step 485 a portion of the memory resources previously allocated to high resolution anchor frame storage are re-allocated to the graphics navigation function and to low resolution anchor frame storage. The memory resources allocated to the graphics navigation function comprise resources sufficient to store graphics information for subsequent display on a display device. The graphics information may comprise a relatively simple display of a channel number grid. The graphics information may also comprise a relatively complex display of an electronic program guide. In either case, the re-allocated memory resources must be sufficient to enable the graphics navigation function to be enables. The method 400 then proceeds to step 490.

At step 490 the compression module 200 and decompression module 300 are enabled in a manner similar to that described above with respect to step 450. The method 400 then proceeds to step 495.

At step 495 at least a portion of the re-allocated memory resources is used to store, e.g., graphics information representative of a navigation overlay screen. The overlay screen may be displayed as a translucent or opaque video or graphics layer on a display device. The method 400 then proceeds to step 498 where it waits for a user selection command. Upon receiving a user selection command, the method 400 proceeds to step 470 where a new channel is selected, and to step 410 where memory is reallocated to high resolution anchor frame storage.

It is critical to note that the non-decimating operation of the compression module 200 and the non-interpolation operation of the decompression module 300 operate in the frequency domain to provide a relatively "low loss" compression and decompression (CODEC) method and apparatus. This means that images produces using this frequency domain CODEC retain much of there image quality. By contrast, the optional pixel domain CODEC (i.e., decimation and interpolation) produces a much lower quality image. This distinction may be critical where, e.g., a high resolution display device (e.g., an HDTV television system) is used to provide navigation or other information services to a user.

The amount of memory resources allocated and/or re-allocated is be related to several factors. For example, in one embodiment of the invention including a total of 16 Mbits of memory, a first mode of operation provides an allocation approximately as follows: 82% for an anchor frame storage function, 12% for a PES Audio/Video buffer function, 3% for an audio function and 3% for an on screen display (OSD) bit map and display control function. A second mode of operation (e.g., a navigation function) provides an allocation approximately as follows: 36% for an expanded OSD bit map and display control function, 30% to store a last frame from a last channel watched, 12% for PES Audio/Video buffer function, 3% for an audio function and 19% for a PIP video function (% errors are due to rounding).

The amount of memory resources, in terms of both available storage capacity and available bandwidth, that is to be allocated and/or re-allocated is related to the amount of compression imparted to the pixel information (S5) by the compression module 200 (e.g., 2:1, 3:1, 4:1 8:1 or other compression factor). This relationship will now be explained with respect to FIG. 7.

Figure 7:
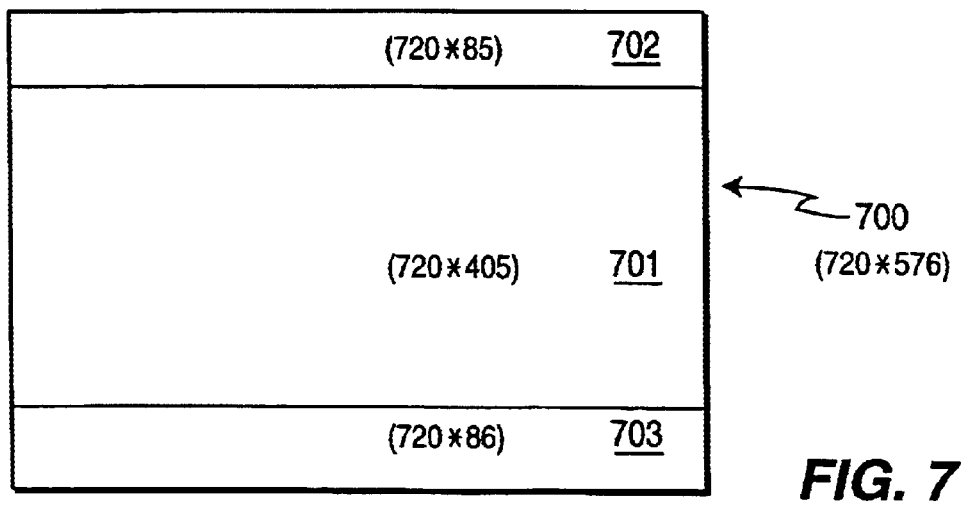
FIG. 7 depicts a letter box display useful in understanding the invention.

FIG. 7 depicts a letter box display useful in understanding the invention. Specifically, FIG. 7 depicts an image region 700 (e.g., a 720×576 pixel image region) of a display device having a 4:3 aspect ratio. The image region 700 is used to display a 16:9 format image within an active video region or window 701, as defined by an upper mask region 702 and a lower mask region 703. For exemplary purposes, assume that the image region 700 comprises a 720×576 pixel region, the upper mask region comprises a 720×85 pixel region, the lower mask region comprises a 720×86 pixel region and the active video window comprises a 720×405 pixel region.

An inventor analysis of one aspect of the invention will now be described using a combined compression module memory 205 and decompression module memory 305 comprising 16 Megabits of memory. In this case, an exemplary allocation of memory space within the MPEG-like decoder 100 of FIG. 1 in support of MPEG-2 video decode and display operations as depicted in FIG. 7, and associated audio decode and presentation operations is as follows: Video decode/display at approximately 81.6%; Audio decode/present at approximately 3.1%; PEW Buffers at approximately 11.9%; and OSD and Control operations at approximately 3.4%.

Similarly, assume that an available memory input/output bandwidth of the combined compression module memory 205 and decompression module memory 305 is approximately 2,074 Megabytes per second for a 81 Megahertz operating interface for device 205 and 305. In this case, the memory bandwidth of the combined compression module memory 205 and decompression module memory 305 required to support the MPEG-2 video decode and display operations as depicted in FIG. 7, and associated audio decode and presentation operations is as follows: Video decoding at approximately 51.9%; Video display at approximately 21.6%; PES Buffer at approximately 2.4%; Audio decoding at approximately 2.9% and OSD and Control at approximately 21.2%.

Referring now to both step 445 of the method 400 of FIG. 4, in the case of the of the compression module 200 imparting a 4:1 compression of pixel information to produce a picture in picture (PIP) or auxiliary image window comprising a 360×240 pixel window, the reallocation of memory resources utilizing an embodiment of the invention was measured by the inventor. The results are presented below in Table 1

TABLE 1

|  | Re-allocated Memory Space | Re-Allocated Memory bandwidth |
| --- | --- | --- |
| Video decoder (active) | 19.5% | 26.0% |
| Video display (static) | 29.7% | 21.6% |
| PES Buffer | 11.9% | 2.4% |
| Audio Decode | 3.1% | 2.4% |
| OSD and Control | 35.8% | 47.1% |
|  | 100% (16 Mbits avail) | 100% (2,074 Mbytes/sec avail) |

Thus, it can be seen that the invention re-allocates almost 10 times more space and more than twice the available bandwidth to, e.g., the OSD functions that now can be utilized for channel navigation or reused by other PIP functions, as noted below with respect to FIG. 5.

Figure 5:
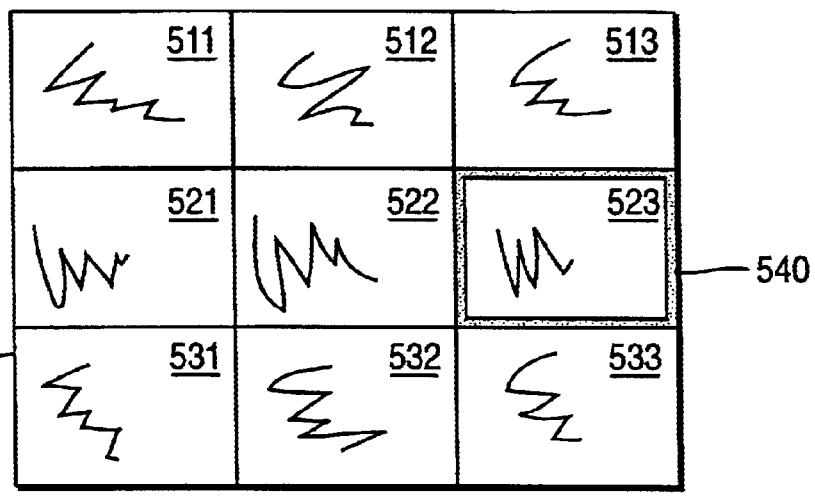
FIG. 5 depicts a picture in picture (PIP) display suitable for use in a PIP navigation system.

FIG. 5 depicts a picture in picture (PIP) display 500 suitable for use in a PIP navigation system. Specifically, FIG. 5 depicts a PIP navigation image 510 comprising a three by three grid of sub-images 511–533. Each sub-image is associated with a respective information channel. A user, via a remote control device (not shown), manipulates a highlight region 540 via up and down arrow keys, left and right arrow keys or a joy stick arrangement until a sub-image associated with a channel to be selected is highlighted. In the PIP navigation image 510 of FIG. 5, the sub-image 523 located in the second row and third column of the PIP grid is shown as being highlighted. After highlighting a sub-image associated with a desired channel, the user presses, e.g., a "enter" key on the remote control device to indicate selection of the highlighted channel.

Thus, in the case of channel navigation using image information, a plurality of static sub-images and a dynamic sub-image are displayed. Each of the plurality of static images represents a sample image from a respective previously selected image bearing information channel, while the dynamic image represents image representing imagery from a presently selected image bearing information channel. The sub-images may be formed by first decompressing and then size adjusting a portion of an information stream (e.g., only the I-frames) of an entire information stream. size reduction of the decoded images may be performed in the pixel domain (e.g., by decimation and sub-sampling techniques) or in the frequency domain (e.g., by DCT coefficient truncation, wavelet processing and the like).

In one embodiment of the invention, the compression module 200 of the MPEG-like decoder 100 of FIG. 1 is used to produce the image information used in each of the plurality of sub-images 511–533 of the PIP navigation screen 510 of FIG. 5. Specifically, in the aforementioned PIP navigation mode, a single frame, e.g., an I-frame or P-frame comprising anchor information received via signal path S5 is compressed from an initial relatively high resolution image frame into a relatively low resolution image frame. The resultant relatively low resolution image frame may be associated with a coordinate indicative of a display screen placement or may be simply stored in a memory location associated with a particular onscreen display placement. For example, in the case of producing the sub-image or inset image 511 depicted in FIG. 5, the channel associated with that image is decoded by the MPEG-like decoder to produce an image frame, such as an I-frame or a P-frame, which is then compressed by the compressor 200. The compressed image frame is then associated with a particular onscreen coordinate based upon storage and a particular display frame memory or other means.

In one embodiment of the invention, the highlighted sub-image (e.g., sub-image 523 in FIG. 5) is selected for decoding by the decoder 100 of FIG. 1. As such, a sub-image 523 comprises moving images and, optionally, associated audio information. To reduce the amount of time and processing resources expended to decode the video information associated with the highlighted sub-image, the MPEG-like decoder 100 of FIG. 1 may decode only a portion of the video information associated with, a sub-image. For example, in one embodiment of the invention the MPEG-like decoder 100 may decode only I-frames associated with the sub-image. In this manner, the decoder can "multitask" such that the other displayed sub-images may be updated at a rate sufficient to provide the user with useful information.

In still another embodiment of the invention, the MPEG-like decoder 100 of FIG. 1 is cause to selectively decode a single frame, which is then compressed by compressor 200, for each of the plurality of channels associated with respective sub-image portions of the display 500 of FIG. 5. In this embodiment of the invention (or other embodiments of the invention) the highlighted portion 540 may be associated only with audio information. That is, the audio information within the channel highlighted by highlighting region 540 is decoded continuously (or relatively continuously) while single images from each of the channel associated with the respective plurality of sub-image regions are decoded on a "round robin" basis.

Figure 6:
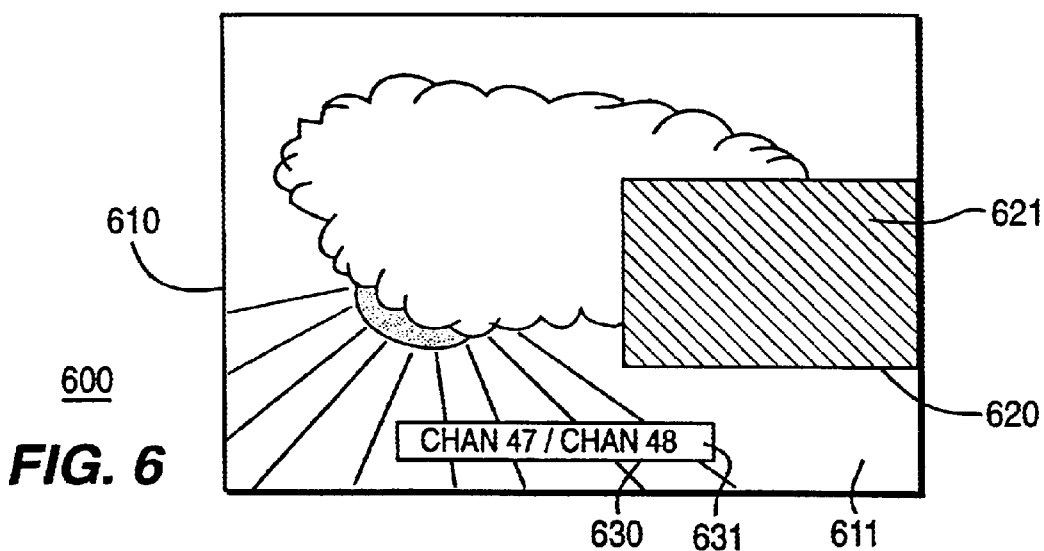
FIG. 6 depicts a display suitable for use in a graphics-based navigation system.

FIG. 6 depicts a display suitable for use in a graphics-based navigation system. Specifically, FIG. 6 depicts a display 600 comprising a main image display region 610, an auxiliary image display region 620, and a graphics display region 630. The main image display region 610 comprises a main video or graphical display 611 (e.g., a view of the sky or an electronic program guide), the auxiliary image display region 620 comprises an auxiliary image 621 (e.g., some graphical or video information), while the graphics display region 630 comprises a graphical information bar depicting, illustratively, channel identification information related to the main and auxiliary image display region 610, 620. That is, in the display 600 of FIG. 6, image information within by main image display region 611 is received via channel 47, while image information 621 within the auxiliary image display region 620 is received via channel 48. The channel information is displayed in the graphical image region 630. In this embodiment the graphics information is displayed as a layer over image information within the main image display region 610. Those skilled in the art will readily appreciate that graphical navigation information may be displayed in many different ways. Moreover, it is noted that each of the regions (610, 620 and 630) of the display 600 of FIG. 6 may be used to provide either video information or graphics information.

The above-described invention provides a practical alternative to the memory resource and bandwidth problem within, e.g., a high resolution decoding system by allocating memory based upon operating mode. In a high resolution mode, the decoder function utilizes sufficient anchor frame memory to store high resolution anchor frame images such that high accuracy image prediction may be performed. However, in a low resolution mode, such as a PIP or graphics navigation mode where individual decoded image quality is less important (though a resulting mosaic of sub-images must comprise a high resolution image), the decoder utilizes less memory for anchor frame storage and more memory for compression, decompression navigation and other functions.

The present invention can be embodied in the form of computer-implemented processes and apparatuses for practicing those processes. The present invention also can be embodied in the form of computer program code embodied in tangible media, such as floppy diskettes, CD-ROMs, hard drives, or any other computer readable storage medium, wherein , when the computer program code is loaded into and executed by a computer, the computer becomes an apparatus for practicing the invention. The present invention can also be embodied in the form of computer program code, for example whether stored in a storage medium, loaded into and/or executed by a computer, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose microprocessor, the computer program code segments configure the microprocessor to create specific logic circuits.

Although various embodiments which incorporate the teachings of the present invention have been shown and described in detail herein, those skilled in the art can readily devise many other varied embodiments that still incorporate these teachings.

What is claimed is:

1. In a system for decoding an MPEG-like information stream including compressed image information, a method for adapting memory usage comprising the steps of:

allocating, in a first mode of operation, a first level of available memory resources for storing relatively high resolution anchor frame information;

allocating, in a second mode of operation, a second level of available memory resources for storing relatively low resolution anchor frame information, said first level of available memory resources being larger than said second level of available memory resources; and allocating, in said second mode of operation, a third level of available memory resources to a processing task, said third level of available memory resources comprising a resource level allocation difference between said first and second level of available memory resources.

2. The method of claim 1, wherein said relatively high resolution anchor frame information comprises a high definition image frame.

3. The method of claim 2, wherein said relatively low definition anchor frame information comprises a standard definition image frame.

4. The method of claim 1, further comprising the step of:

compressing, in said second mode of operation, said relatively high resolution anchor frame information to produce said relatively low resolution anchor frame information.

5. The method of claim 4, wherein said available memory resources are used for at least one of anchor frame storage, decoder output buffering and graphics information buffering.

6. The method of claim 1, wherein said first mode of operation is entered in response to user interaction indicative of a selection of an information channel providing relatively high resolution image information.

7. The method of claim 1, wherein said second mode of operation is entered in response to user interaction indicative of a selection of a channel navigation function, said channel navigation function providing, on a display device, one of an image layer and a graphics layer including channel navigation information.

8. The method of claim 1, wherein said processing task comprises a channel navigation task.

9. The method of claim 8, wherein said channel navigation task comprises the steps of:

decoding, for each of a plurality of channels, a respective image frame;

storing, in a respective portion of a display buffer located within said third level of available memory resources, each respective image frame;

displaying, on a display device, image information within said display buffer.

10. The method of claim 9, wherein said second mode of operation is entered in response to user interaction indicative of a selection of said channel navigation task, and said first mode of operation is entered in response to user interaction indicative of a selection of an information channel providing relatively high resolution image information.

11. The method of claim 8, wherein said channel navigation task comprises the steps of:

storing, in a respective portion of a display buffer located within said third level of available memory resources, navigation information comprising one of graphics information or image information;

displaying, on a display device, image information within said display buffer.

12. The method of claim 11, wherein:

in the case of said navigation information comprising image information, said navigation information comprises a plurality of static sub-images and a dynamic sub-image, each of said plurality of static images representing a sample image from a respective previously selected image bearing information channel, said dynamic image representing, said dynamic image representing imagery from a presently selected image bearing information channel.

13. The method of claim 12, wherein said static images are formed according to the steps of:

decoding a respective I-frame from each of the plurality of image bearing information channels;

reducing the size of each decoded I-frame; and storing, in respective portions of a display memory, the size reduced decoded I-frames.

14. The method of claim 13, wherein said dynamic image is formed according to the steps of:

decoding image information stream received via an image bearing information channel to produce a sequence of image frames;

reducing the size of each decoded image frame; and continually storing, in a respective portion of the display memory, the decoded image frames.

15. The method of claim 12, wherein said static images are formed according to the steps of:

decoding, at a reduced size or resolution, a respective I-frame from each of the plurality of image bearing information channels;

storing, in respective portions of a display memory, the decoded I-frames.

16. The method of claim 13, wherein said dynamic image is formed according to the steps of:

decoding, at a reduced size or resolution, image information stream received via an image bearing information channel to produce a sequence of image frames;

continually storing, in a respective portion of the display memory, the decoded image frames.

17. In a system for decoding an MPEG-like information stream including compressed image information, apparatus comprising:

allocable memory resources, responsive to a control signal, for storing an uncompressed anchor frame in a first mode of operation and for storing a compressed anchor frame in a second mode of operation, wherein a portion of said allocable memory resources are allocated to at least one additional function during said second mode of operation; and a controller, for generating said control signal in response to a user request;

said controller causing said allocable memory resources to enter said first mode of operation in response to a user request to select a channel for viewing.

18. The apparatus of claim 17, wherein:

said controller causing said allocable memory resources to enter said second mode of operation in response to a user request to enter a channel navigation mode, said navigation mode comprising one of a picture in picture (PIP) navigation mode and a graphics navigation mode.

19. The apparatus of claim 17, wherein said relatively high resolution anchor frame information comprises one of a high definition image frame and a standard definition image frame.

20. The apparatus of claim 17, further comprising:

a compressor, for compressing, in said second mode of operation, said relatively high resolution anchor frame information to produce said relatively low resolution anchor frame information.

21. The apparatus of claim 20, wherein said available memory resources are used for at least one of anchor frame storage, decoder output buffering and graphics information buffering.

22. The apparatus of claim 17, wherein said first mode of operation is entered in response to user interaction indicative of a selection of an information channel providing relatively high resolution image information.

23. The apparatus of claim 17, wherein said second mode of operation is entered in response to user interaction indicative of a selection of a channel navigation function, said channel navigation function providing, on a display device, one of an image layer and a graphics layer including channel navigation information.

* * * * *

UNITED STATES PATENT AND TRADEMARK OFFICE
CERTIFICATE OF CORRECTION

PATENT NO. : 6,633,608 B1
DATED : October 14, 2003
INVENTOR(S) : Henry S. Miller It is certified that error appears in the above-identified patent and that said Letters Patent is hereby corrected as shown below:

<u>Title page,</u>
Item [75], Inventor, please correct the spelling of the inventor's last name to read
-- Henry S. Miiller --.

Signed and Sealed this

Twenty-fourth Day of February, 2004

JON W. DUDAS
*Acting Director of the United States Patent and Trademark Office*

UNITED STATES PATENT AND TRADEMARK OFFICE
CERTIFICATE OF CORRECTION

PATENT NO. : 6,633,608 B1
DATED : October 14, 2003
INVENTOR(S) : Miiller

It is certified that error appears in the above-identified patent and that said Letters Patent is hereby corrected as shown below:

Title page,
Item [75], Inventor, please change "Miller" to -- Miiller --.
Item [57], ABSTRACT, please change "CODE" TO -- CODEC --.

Drawings,
Fig. 1, please add the legend "M4" to the dotted line connecting Controller (150) to Output Buffer (118);
Fig. 3, please add the legend "S7" to the arrow connecting HARR-1 (330) and IDCT (340);
Fig. 4A, delete the arrow from the decision box Graphics Navigation?(475) to the step Enable Anchor Compressor and Decompressor (450).

Column 1,
Lines 17 and 19, please change "ISO/ICE" to -- ISO/IEC --.

Column 2,
Line 11, please change "down sized" to -- downsized --.

Column 3,
Line 17, please change "DAB" to -- DVB --.
Lines 46 and 62, please change "VELD" to -- VLD --.
Line 48, please change "(ID CT)" to -- (IDCT) --.

Signed and Sealed this

Eleventh Day of May, 2004

JON W. DUDAS
*Acting Director of the United States Patent and Trademark Office*